United States Patent
Mathew et al.

(10) Patent No.: US 12,152,108 B2
(45) Date of Patent: Nov. 26, 2024

(54) FLAME RETARDANT POLYAMIDE COMPOSITIONS

(71) Applicant: Celanese Polymer Holdings, Inc., Wilmington, DE (US)

(72) Inventors: Annakutty Mathew, Kingston (CA); Masahiro Nozaki, Tochigi (JP)

(73) Assignee: Celanese Polymers Holding, Inc., Wilmington, DE (US)

( * ) Notice: Subject to any disclaimer, the term of this patent is extended or adjusted under 35 U.S.C. 154(b) by 0 days.

(21) Appl. No.: 16/649,373

(22) PCT Filed: Aug. 30, 2018

(86) PCT No.: PCT/US2018/048692
§ 371 (c)(1),
(2) Date: Mar. 20, 2020

(87) PCT Pub. No.: WO2019/060117
PCT Pub. Date: Mar. 28, 2019

(65) Prior Publication Data
US 2020/0247951 A1 Aug. 6, 2020

Related U.S. Application Data

(60) Provisional application No. 62/561,337, filed on Sep. 21, 2017.

(51) Int. Cl.
| | |
|---|---|
| C08G 69/26 | (2006.01) |
| C08K 3/105 | (2018.01) |
| C08K 3/34 | (2006.01) |
| C08K 5/20 | (2006.01) |
| C08K 5/5313 | (2006.01) |
| C08K 7/14 | (2006.01) |
| C08L 77/06 | (2006.01) |
| C08K 3/22 | (2006.01) |
| C08K 3/38 | (2006.01) |

(52) U.S. Cl.
CPC ............ *C08G 69/265* (2013.01); *C08K 3/105* (2018.01); *C08K 3/346* (2013.01); *C08K 5/20* (2013.01); *C08K 5/5313* (2013.01); *C08K 7/14* (2013.01); *C08L 77/06* (2013.01); C08K 2003/2227 (2013.01); C08K 2003/2296 (2013.01); C08K 2003/387 (2013.01)

(58) Field of Classification Search
CPC ...... C08G 69/265; C08K 3/105; C08K 3/346; C08K 5/20; C08K 5/5313; C08K 7/14; C08K 2003/2227; C08K 2003/2296; C08K 2003/387; C08L 77/06
See application file for complete search history.

(56) References Cited

U.S. PATENT DOCUMENTS

| | | | | |
|---|---|---|---|---|
| 6,140,459 A | * | 10/2000 | Leboeuf | C08G 69/265 528/310 |
| 2009/0030124 A1 | | 1/2009 | Yige | |
| 2010/0113657 A1 | * | 5/2010 | Seki | C08K 5/098 524/133 |
| 2010/0249292 A1 | | 9/2010 | Saga et al. | |
| 2012/0083558 A1 | * | 4/2012 | Bayer | C08K 5/098 524/101 |
| 2014/0179851 A1 | | 6/2014 | Pfleghar et al. | |
| 2014/0179866 A1 | * | 6/2014 | Pfleghar | C08L 77/06 524/607 |
| 2015/0175804 A1 | * | 6/2015 | Aepli | C08K 3/24 428/35.7 |
| 2016/0060436 A1 | * | 3/2016 | Stoeppelmann | C09C 1/02 524/538 |
| 2016/0271921 A1 | | 9/2016 | Berger et al. | |
| 2017/0313845 A1 | * | 11/2017 | Guo | C08J 9/0076 |

FOREIGN PATENT DOCUMENTS

| | | | | |
|---|---|---|---|---|
| EP | 335873 B1 | * | 6/1993 | ............... C08K 3/01 |
| EP | 2163574 A1 | * | 3/2010 | ............ C08J 9/0061 |
| EP | 2459639 A1 | | 6/2012 | |
| JP | 2009062479 A | * | 3/2009 | ............. C08L 67/04 |
| WO | 2005/033192 A1 | | 4/2005 | |
| WO | 2011/014556 A1 | | 2/2011 | |
| WO | 2015/057557 A1 | | 4/2015 | |

OTHER PUBLICATIONS

Meehan, Thomas Heat deflection temperature: An essential part of injection molding. Sep. 14, 2017. https://www.linkedin.com/pulse/heat-deflection-temperature-essential-part-injection-molding-meehan Accessed Mar. 2, 2023. (Year: 2017).*
English machine translation of JP 2009-062479A. (Year: 2009).*
International Search Report and Written Opinion in International Application No. PCT/US2018/048692, issued Dec. 10, 2018.

* cited by examiner

*Primary Examiner* — John E Uselding
(74) *Attorney, Agent, or Firm* — Dority & Manning, P.A.

(57) ABSTRACT

A polyamide composition comprising: (a) 30 to about 60 weight percent of at least one semi-aromatic polyamide comprising: (i) 63 to about 70 mole percent hexamethylene terephthalamide repeat units; and (ii) about 30 to about 37 mole percent hexamethylene decanamide or hexamethylene dodecanamide repeat units; (b) 3 to 30 weight percent of at least one flame retardant; (c) 0.02 to 0.65 weight percent of a lubricant; (d) 5 to 50 weight percent of at least one inorganic reinforcing agent; (e) 0 to 5 weight percent of a nucleant; and (f) 0.2 to 10 weight percent of at least one flame retardant synergist. Such compositions exhibit a combination of a molding cooling time of less than or equal to 9 seconds; a reflow peak temperature of at least 270° C.; and a flammability of V-0 measured according to UL-94 flammability test.

12 Claims, 3 Drawing Sheets

FLAME RETARDANT POLYAMIDE COMPOSITIONS

OVERVIEW

Described herein are novel semiaromatic polyamide compositions having a combination of desirable physical properties including molding cooling times, flame retardancy, reflow peak temperatures, and moisture adsorption. Also described herein are processes to prepare these compositions and articles prepared from these semiaromatic polyamide compositions.

Polyamide resins possess excellent mechanical properties, moldability, and chemical resistance and have therefore been used in automotive parts, electric/electronic components, mechanical components, and many other applications.

Articles made from polyamide resins can possess extremely desirable physical properties. However, in certain applications, it is desirable that polyamide compositions be flame retardant and meet the UL-94 standard for a high degree of flame retardance.

This need has promoted research into a variety of methods for imparting flame retardance to polyamide resins. The addition of phosphinates or disphosphinates as flame retardant additives to polyamide resins is known but their presence can influence certain properties of the composition.

It would thus be desirable to obtain a non-halogenated flame retardant semiaromatic polyamide composition having a combination of desirable physical properties such as reflow peak temperatures, molding cooling times, flame retardancy, and moisture adsorption.

US patent application 2009/0030124 discloses a flame retardant polyamide composition comprising a semi-aromatic polyamide, a flame retardant, zinc borate, and an optional filler.

WO 2005/033192 discloses a flame retardant polyamide composition comprising a semi-aromatic polyamide derived from 5 to 75 mol % of semi-aromatic monomers, a flame retardant, and optionally a reinforcing agent and a synergist.

US patent application 2014/0179851 discloses a mixture of semi-aromatic polyamides and aliphatic polyamides in which the semi-aromatic polyamide may comprise terephthalic acid.

US patent application 2016/0271921 discloses a multilayer composite having a first layer comprising a semi-aromatic polyamide obtained from a) 41 to 90 mol % of a combination of hexamethylenediamine and terephthalic acid, and b) 59 to 10 mol % of a combination of hexamethylenediamine and a linear aliphatic dicarboxylic acid having 8 to 19 carbon atoms.

ABBREVIATIONS

Figure 1:
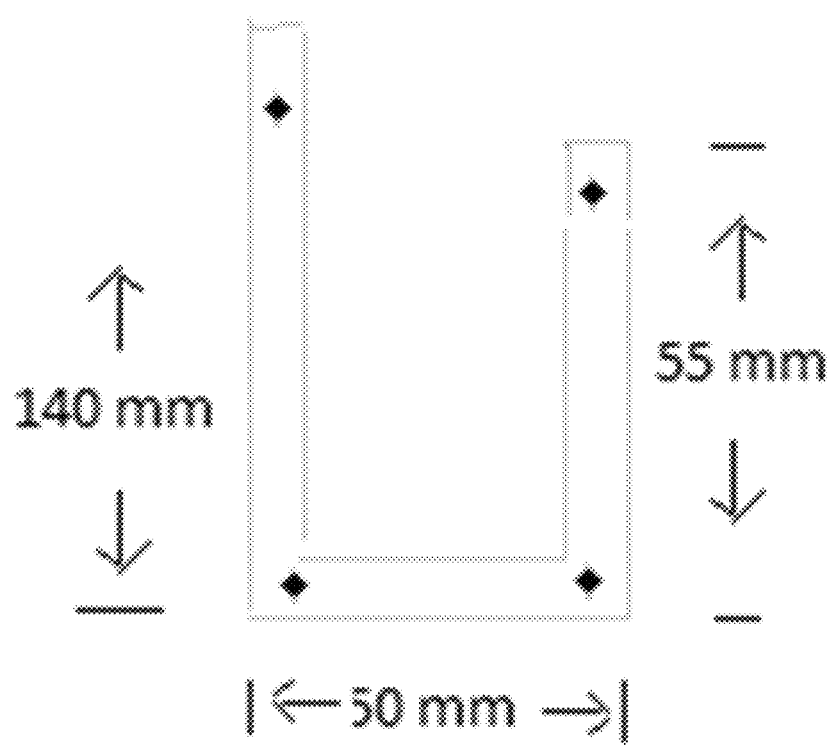
FIG. 1 is a top view of the molded test sample used to measure molding cooling time.

The claims and description herein are to be interpreted using the abbreviations and definitions set forth below.

"%" refers to the term percent.
"wt %" refers to weight percent.
"mp" refers to melting point
"DSC" refers to differential scanning calorimetry
"° C." refers to degrees centigrade
"mol %" refers to mole percent
"s" refers to seconds
"dl/g" refers to deciliter/gram of sample

Definitions

As used herein, the article "a" refers to one as well as more than one and does not necessarily limit its referent noun to the grammatical category of singular number.

As used herein, the term "article" refers to an item, thing, structure, object, element, device, etc. that is in a form, shape, configuration that is suitable for a particular use or purpose without further processing of the entire entity or a portion of it.

As used herein, the term "repeat unit" refers to part of a polymer whose repetition would produce the complete polymer chain. For example, for polyamide 66 the repeat unit is an adipic acid monomer bonded to a hexamethylenediamine monomer such that the repeat unit is adipic acid-hexamethylenediamine bonded together by an amide linkage. The resulting polymer is hexamethylene adipamide.

As used herein, the terms "polyamide resin", "polyamide", and "polymer resin" refer to the neat polymer used in the polymer compositions and only comprises the polymer chain produced from the respective monomers. In other words, no additional additives are present in the polymer except possibly minor amounts of residual materials used in the manufacturing process.

As used herein, the term "polyamide composition" refers to a polyamide resin and, optionally, any additional materials used in the composition such as UV stabilizers, lubricants, flame retardants, and fillers.

As used herein, the term "reflow peak temperature" refers to maximum temperature an article comprising a polyamide composition can be exposed to during manufacture or processing of the article, such as SMT connectors, without the polyamide composition blistering or exhibiting other surface defects.

As used herein, the term "blister" refers to a bubble or imperfection which is present on the surface of a molded article and is visible to the unaided human eye. In other words, a blister is a raised area on the surface of a molded article which is visible when the molded article is viewed from above the molded article.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

GENERALLY

Disclosed herein are novel semi-aromatic polyamides that, in combination with phosphinate and/or diphosphinate flame retardants, flame retardant synergists, lubricants, reinforcing agents, and specific additional additive(s) provides semi-aromatic polyamide compositions which exhibit a combination of desirable physical properties.

Depending on the 6T (hexamethylene terephthalamide) molar concentration in the semi-aromatic polyamides disclosed herein, polyamide compositions prepared from these semi-aromatic polyamides may exhibit a desirable combination of molding cooling times, flame retardancy, moisture adsorption, and reflow peak temperatures of at least 270° C.

Also disclosed herein are articles prepared from these semi-aromatic polyamide compositions and processes for preparing these compositions.

Specifically, disclosed herein are semi-aromatic polyamide compositions comprising:
(a) 30 to about 60 weight percent of at least one semi-aromatic polyamide comprising:
 (i) 63 to about 70 mole percent hexamethylene terephthalamide repeat units; and
 (ii) about 30 to about 37 mole percent hexamethylene decanamide or hexamethylene dodecanamide repeat units;
(b) 3 to 30 weight percent of at least one flame retardant comprising one or more of a phosphinate of the formula (I); a diphosphinate of the formula (II); and polymers of (I) and/or (II)

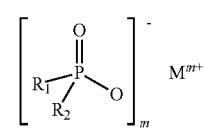
(I)

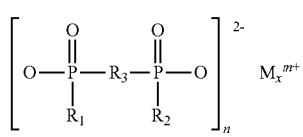
(II)

wherein $R_1$ and $R_2$ are independently selected from hydrogen, a linear, branched, or cyclic $C_1$-$C_6$ alkyl group, or a $C_6$-$C_{10}$ aryl; $R_3$ being a linear or branched $C_1$-$C_{10}$ alkylene group, a $C_6$-$C_{10}$ arylene group, a $C_6$-$C_{12}$ alkyl-arylene group, or a $C_6$-$C_{12}$ aryl-alkylene group; M being selected from the group consisting of calcium ions, aluminum ions, magnesium ions, zinc ions, antimony ions, tin ions, germanium ions, titanium ions, iron ions, zirconium ions, cerium ions, bismuth ions, strontium ions, manganese ions, lithium ions, sodium ions, potassium ions and combinations thereof; and m, n, and x each being a same or different integer of 1-4;
(c) 0.02 to 0.65 weight percent of a lubricant;
(d) 5 to 50 weight percent of at least one inorganic reinforcing agent;
(e) 0 to 5 weight percent of a nucleant; and
(f) 0.2 to 10 weight percent of a flame retardant synergist; and
wherein:
the weight percentages of (a) to (f) are based on the total weight of the polyamide composition;
the weight percentages of (a) to (f) equal 100 weight percent;
said polyamide composition exhibits a molding cooling time of less than or equal to 9 seconds; and
said polyamide composition exhibits a reflow peak temperature of at least 270° C.;
said polyamide composition exhibits a flammability of V-0 measured according to UL-94 flammability test.

Further disclosed herein are polyamide compositions comprising:
(a) 30 to about 60 weight percent of at least one semi-aromatic polyamide comprising:
 (i) about 60 to less than 63 mole percent hexamethylene terephthalamide repeat units; and
 (ii) about 37 to about 40 mole percent hexamethylene decanamide or hexamethylene dodecanamide repeat units;
(b) 3 to 30 weight percent of at least one flame retardant comprising one or more of a phosphinate of the formula (I); a diphosphinate of the formula (II); and polymers of (I) and/or (II)

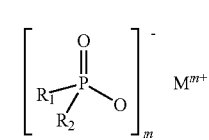
(I)

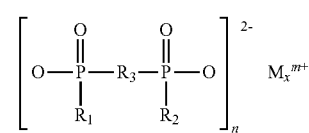
(II)

wherein $R_1$ and $R_2$ are independently selected from hydrogen, a linear, branched, or cyclic $C_1$-$C_6$ alkyl group, or a $C_6$-$C_{10}$ aryl; $R_3$ being a linear or branched $C_1$-$C_{10}$ alkylene group, a $C_6$-$C_{10}$ arylene group, a $C_6$-$C_{12}$ alkyl-arylene group, or a $C_6$-$C_{12}$ aryl-alkylene group; M being selected from the group consisting of calcium ions, aluminum ions, magnesium ions, zinc ions, antimony ions, tin ions, germanium ions, titanium ions, iron ions, zirconium ions, cerium ions, bismuth ions, strontium ions, manganese ions, lithium ions, sodium ions, potassium ions and combinations thereof; and m, n, and x each being a same or different integer of 1-4;
(c) 0.02 to 0.65 weight percent of a lubricant;

(d) 5 to 50 weight percent of at least one inorganic reinforcing agent;
(e) 0.02 to 5 weight percent of a nucleant; and
(f) 0.2 to 10 weight percent of a flame retardant synergist; and wherein:
the weight percentages of (a) to (f) are based on the total weight of the polyamide composition;
the weight percentages of (a) to (f) equal 100 weight percent;
said polyamide composition exhibits a molding cooling time of less than or equal to 9 seconds;
said polyamide composition exhibits a reflow peak temperature of at least 270° C.; and
said polyamide composition exhibits a flammability of V-0 measured according to UL-94 flammability test.

Semi-Aromatic Polyamide (a)

The semi-aromatic polyamide used in the polyamide compositions disclosed herein comprises (i) about 60 to about 75 mole percent hexamethylene terephthalamide repeat units; and (ii) about 25 to about 40 mole percent hexamethylene decanamide or hexamethylene dodecanamide repeat units.

Preferably, the semi-aromatic polyamide used in the polyamide compositions disclosed herein comprises (i) about 63 to about 70 mole percent hexamethylene terephthalamide repeat units; and (ii) about 30 to about 37 mole percent hexamethylene decanamide or hexamethylene dodecanamide repeat units.

More preferably, the semi-aromatic polyamide used in the polyamide compositions disclosed herein comprises (i) about 63 to about 68 mole percent hexamethylene terephthalamide repeat units; and (ii) about 32 to about 37 mole percent hexamethylene decanamide or hexamethylene dodecanamide repeat units.

These semi-aromatic polyamides may also be described as poly(hexamethylene terephthalamide/hexamethylene decanamide) (PA6T/610) and poly(hexamethylene terephthalamide/hexamethylene dodecanamide) (PA6T/612) having molar ratios of 6T/610 or 6T/612 ranging from 60/40 to 75/25, preferably from 63/37 to 70/30.

The weight percent of semi-aromatic polyamide in the polyamide compositions disclosed herein range from about 25 to 60 weight percent, preferably from 35 to 60 weight percent, and more preferably from about 40 to 55 weight percent, based on the total weight concentrations of ingredients (a) to (f) in the polyamide composition.

Flame Retardant (b)

The at least one flame retardant (b) used in the polyamide compositions disclosed herein are phosphorus-based flame retardants selected from the group consisting of phosphinates of formula (I), disphosphinates of formula (II), and combinations of these:

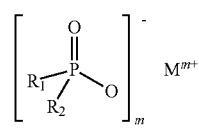

(I)

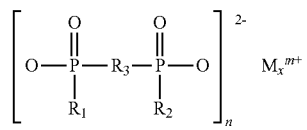

(II)

wherein $R_1$ and $R_2$ are independently selected from hydrogen, a linear, branched, or cyclic $C_1$-$C_6$ alkyl group, or a $C_6$-$C_{10}$ aryl; $R_3$ being a linear or branched $C_1$-$C_{10}$ alkylene group, a $C_6$-$C_{10}$ arylene group, a $C_6$-$C_{12}$ alkyl-arylene group, or a $C_6$-$C_{12}$ aryl-alkylene group; M being selected from the group consisting of calcium ions, aluminum ions, magnesium ions, zinc ions, antimony ions, tin ions, germanium ions, titanium ions, iron ions, zirconium ions, cerium ions, bismuth ions, strontium ions, manganese ions, lithium ions, sodium ions, potassium ions and combinations thereof; and m, n, and x each being a same or different integer of 1-4.

Preferably, the at least one phosphorus-based flame retardant is selected from the group consisting of aluminum diethylphosphinate, aluminum methylethylphosphinate, zinc diethylphosphinate, zinc methylethylphosphinate, aluminum isopropylisobutylphosphinate, aluminum isopropyltertbutylphosphinate, aluminum diisobutylphosphinate, and combinations of these.

The weight percent of flame retardant (b) in the polyamide compositions disclosed herein ranges from about 3 to 30 weight percent, preferably from 5 to 25 weight percent, and more preferably from about 10 to 25 weight percent, based on the total weight concentrations of ingredients (a) to (f) in the polyamide composition.

Lubricant (c)

The polyamide compositions disclosed herein may comprise from 0.02 to 0.65 weight percent, preferably 0.04 to 0.60 weight percent, more preferably 0.1 to 0.55 weight percent, and most preferably 0.1 to 0.5 weight percent of a lubricant based on the total weight of the polyamide composition. The lubricant may be added during mixing with the other ingredients to prepare the polyamide composition or the lubricant may be added to the surface of the polyamide composition after palletization.

The lubricant may be selected from the group consisting of fatty acid amides and fatty acid metal salts.

Fatty acids as used herein for preparing fatty acid amide lubricants are acids which comprise 10 to 30 carbon atoms, preferably 12 to 30, more preferably 18 to 30 carbon atoms. The fatty acid may comprise linear or branched carbon chains. Preferably the fatty acid used to prepare the fatty amide lubricants disclosed herein comprise 12 to 30 carbon atoms in a linear carbon chain.

Examples of fatty acids include lauric acid, myristic acid, myristoleic acid, palmitic acid, palmitoleic acid, stearic acid, 12-hydroxy stearic acid, oleic acid, elaidic acid, vaccenic acid, arachidic acid, gadoleic acid, eicosenoic acid, behenic acid, erucic acid, lignoceric acid, nervonic acid, lignoceric acid and montanic acid. Examples of the fatty acid amides include fatty acid monoamides, such as, methylstearylamide, ethylstearylamide, dioctadecylstearylamide, dioctadecylsuccinamide, sterarylstearylamide, stearyleruccamide, phenylstrearylamide, methylolsrearylamide, and fatty acid bis amides, such as methylene-bis sterarylamide, ethylene-bis stearylamide, ethylene-bis (12 hydroxyphenyl) stearylamide.

Fatty acids as used herein for preparing fatty acid metal salt lubricants are acids which comprise 18 to 30 carbon atoms, preferably 18 to 28, more preferably 22 to 28 carbon atoms. The fatty acid may comprise linear or branched carbon chains. Preferably the fatty acid used to prepare fatty acid metal salt lubricants disclosed here comprise 18 to 28 carbon atoms in a linear carbon chain. Examples of fatty acid metal salts include aluminum stearate, sodium stearate, zinc stearate, calcium stearate, aluminum 12-hydroxy stearate, sodium 12-hydroxy stearate, zinc 12-hydroxy stearate, calcium 12-hydroxy stearate, aluminum behenate, sodium behenate, zinc behenate, calcium behenate, aluminum montanate, sodium montanate, zinc montanate, and calcium montanate.

Useful commercial lubricants for the polyamide compositions include Kemamide® E180 (N-stearylerucamide, CAS No. [10094-45-8]) available from PXC Biotech., Philadelphia, PA; Crodamide® 212 lubricant, a stearyl erucamide available from Croda Chemicals, Hull UK; Licomont® CaV 102 lubricant, a fine grain calcium montanate available from Clariant Corp.; Hostamont® NAV 101 lubricant, a sodium montanate manufactured by Clariant, Muttenz, Switzerland; aluminum stearate, a wax supplied by PMC Global, Inc. Sun Valley, CA, USA; and Acrawax® C lubricant, an N,N'-ethylene bisstearamide from Lonza Chemical Co.

Preferred lubricants which may be used in the polyamide compositions include calcium montanate, N-stearyl erucamide, N,N'-ethylene bisstearamide, aluminum stearate, zinc stearate, calcium stearate, calcium behenate, and combinations of these.

Reinforcing Agent (d)

The polyamide compositions described herein include at least one reinforcing agent for improving mechanical strength and other properties. The reinforcing agent may be a fibrous, tabular, powdery or granular material. Examples of fibrous reinforcing agents include glass fibers, carbon fibers, gypsum fibers, ceramic fibers, asbestos fibers, zirconia fibers, alumina fibers, silica fibers, titanium oxide fibers, and silicon carbide fibers.

The reinforcing agent may also be in powdery, granular or tabular form such as mica, talc, kaolin clay, silica, calcium carbonate, potassium titanate, glass beads, glass flakes, glass microballoons, wollastonite, montmorillonite, titanium oxide, zinc oxide, and graphite. Two or more reinforcing agents may be combined in these polyamide compositions, and although not expressly stated herein, these compositions may include any combination of reinforcing agents described herein.

Preferred reinforcing agents include glass fibers, glass flakes, kaolin clay, wollastonite, mica, calcium carbonate, silica, carbon fibers, potassium titanate, and combinations of these.

The glass fiber, flake, or bead may be sized or unsized. Suitable glass fibers may be chopped strands of long or short glass fibers, and milled fibers of these.

The reinforcing agent may be processed on its surface with any known coupling agent (e.g., silane coupling agent, titanate coupling agent) or with any other surface-treating agent.

If used, fibers may have a circular or non-circular cross section. A fiber having a non-circular cross section refers to a fiber having a major axis lying perpendicular to a longitudinal direction of the fiber and corresponding to the longest linear distance in the cross section. The non-circular cross section has a minor axis corresponding to the longest linear distance in the cross section in a direction perpendicular to the major axis. The non-circular cross section of the fiber may have a variety of shapes including a cocoon-type (figure-eight) shape; a rectangular shape; an elliptical shape; a semielliptical shape; a roughly triangular shape; a polygonal shape; and an oblong shape. As will be understood by those skilled in the art, the cross section may have other shapes. The ratio of the length of the major axis to that of the minor access is preferably between about 1.5:1 and about 6:1. The ratio is more preferably between about 2:1 and 5:1 and yet more preferably between about 3:1 to about 4:1. Suitable fibers having a non-circular cross section are disclosed in EP Pat. No. 190001 and EP Pat. No. 196194.

The non-circular fibers may be long fibers, chopped strands, milled short fibers, or other suitable forms known to those skilled in the art.

The concentration of reinforcing agent in the polyamide compositions may range from about 5 to about 50 weight percent, preferably about 10 to about 50 weight percent, and more preferably about 20 to about 50 weight percent of the total weight of the polyamide compositions described herein. Even though not expressly stated herein, all possible ranges between 5 and 50 percent reinforcing agent of the total weight of the polyamide composition are contemplated in these compositions.

Nucleant (e)

The nucleant disclosed herein, when present in the polyamide composition, may be any conventional nucleating agent. Thus, a nucleating agent may be organic such as a polymer having a melt point higher than that of the thermoplastic composition or it may be an inorganic material such as talc, molybdenum disulfide, boron nitride, or alkali or alkaline earth metal halide such as LiF, $CaF_2$, and $ZnCl_2$.

When present in the polyamide composition, the concentration of nucleant in the polyamide composition preferably ranges from about 0.02 to 5 weight percent, more preferably 0.05 to 4, and most preferably 0.1 to 2 weight percent, based on the total weight of the polyamide composition.

Flame Retardant Synergist (f)

The polyamide compositions may further comprise one or more flame retardant synergists. The flame retardant synergist(s) used in the polyamide compositions disclosed herein includes for example metal oxides such as silica oxide, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide. Additional flame retardant synergist(s) include metal powders such as aluminum, iron, titanium, manganese, zinc, molybdenum, cobalt, bismuth, chromium, tin, antimony, nickel, copper and tungsten. Additional flame retardant synergist(s) includes metal salts such as barium metaborate, zinc carbonate, magnesium carbonate, calcium carbonate, zinc borate, zinc stannate, and barium carbonate. Mixtures of any of these flame retardant synergists may be used. Preferred flame retardant synergists include, boehmite, aluminum oxide, zinc borate, zinc stannate, and mixtures of these.

The weight percent of flame retardant synergist (f) in the polyamide compositions disclosed herein range from about 0.1 to 10 weight percent, preferably from 0.5 to 10 weight percent, and more preferably from about 1 to 10 weight percent, based on the total weight concentrations of ingredients (a) to (f) in the polyamide composition.

Preparation of Polyamide Compositions

The polyamide composition disclosed herein may be prepared by melt-blending in which all polymeric ingredients are adequately mixed, and all non-polymeric ingredients are adequately dispersed in the polyamide resin matrix. Any melt-blending method may be used for mixing polymeric ingredients and non-polymeric ingredients of the present invention. For example, polymeric ingredients and non-polymeric ingredients may be fed into a melt mixer, such as single screw extruder or twin-screw extruder, agitator, single screw or twin-screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

Polyamide Compositions

The polyamide compositions disclosed herein exhibit a desirable combination of flame retardancy, molding cooling time, and reflow peak temperatures depending on the molar concentration of 6T repeat units and specific additional ingredients, especially lubricants as disclosed herein and present within a specific narrow concentration range. When the 6T concentration ranges from 60 to less than 63 mole percent in the polyamide and the polyamide composition comprises a flame retardant, a flame retardant synergist, a lubricant, a reinforcing agent, and a nucleant, the polyamide composition exhibits a molding cooling time of less than or equal to 9 seconds, a reflow peak temperature of at least 270° C., and a flammability of V-0.

When the 6T concentration ranges from 63 to 70 mole percent in the polyamide and the polyamide composition comprises a flame retardant, a flame retardant synergist, a lubricant, and a reinforcing agent, the polyamide composition exhibits a molding cooling time of less than or equal to 9 seconds, a reflow peak temperature of at least 270° C., and a flammability of V-0. A nucleant is not a necessary component of the polyamide composition in order to achieve the desired combination of properties when the 6T concentration is at least 63 mole percent in the polyamide resin.

Polyamide compositions which have high reflow peak temperatures are useful in the preparation of surface mount technology (SMT) connectors and other electronic devices. If the reflow peak temperatures of the polyamide composition are too low, blistering of the polymer surface may occur during processing.

During manufacture of articles prepared from polyamide compositions disclosed herein by injection molding, it is desirable for the molding cycle to be as short as possible to improve productivity. The molding cooling time is the minimum time needed for the injection molded sample to cool before it can be removed from the mold and be defect free. Defect free refers to molded articles which meet the following criteria: i) the molded article can be ejected from the mold without the molded article sticking to the mold; ii) the molded article does not break during ejection; iii) the molded article does not have any cracks visible to the unaided human eye on its surface; and iv) the molded article retains the dimensions of the mold after being ejected.

For example, if a molded test bar having a molding cooling time of 8 seconds is attempted to be ejected from the mold at 5 seconds, the molded test bar may stick to the mold and not be ejected by the ejector pins, the molded test bar may break during ejection, or the ejector pins may penetrate the molded test bar and not eject the molded test bar. If molded test bar having a molding cooling time of 8 seconds is ejected after 8 seconds, the molded test bar is successfully ejected from the mold without the problems associated with attempting to eject the molded test bar at 5 seconds.

The polyamide compositions may be molded or extruded into articles for use in many application areas including electrical and vehicular components. Specific examples of articles include electrical and electronic connectors, SMT connectors, non-electrical connectors, motor housings, insulators, motor insulators, insulator housings, bobbins, contactor housings, switches, SMT switches, battery housings, terminal blocks, and breaker housings.

EXAMPLES

The novel processes and polyamides disclosed herein are further defined by the following Examples. It should be understood that these examples, while indicating certain preferred aspects of the disclosure, are given by way of illustration only. From the above discussion and these examples, one skilled in the art can ascertain the essential characteristics of this disclosure, and without departing from the spirit and scope thereof, can make various changes and modifications to adapt it to various uses and conditions.

The exemplary articles are identified by "E" in the tables below are intended only to further illuminate and not to limit the scope of compounds, processes, and articles described and recited herein. Comparative examples are identified in the tables below by "C".

Test Methods

Melting Points

Herein melting points were determined by DSC (TA Instruments Q2000, TA Instruments, New Castle, Delaware, USA) at a scan rate of 10° C./min in the first heating scan according to ASTM D3418:2015 wherein the melting point is taken at the maximum of the endothermic peak.

Molding Cooling Time

Figure 2:
FIG. 2 is a side view of the molded test sample used to measure molding cooling time.
Figure 3B:
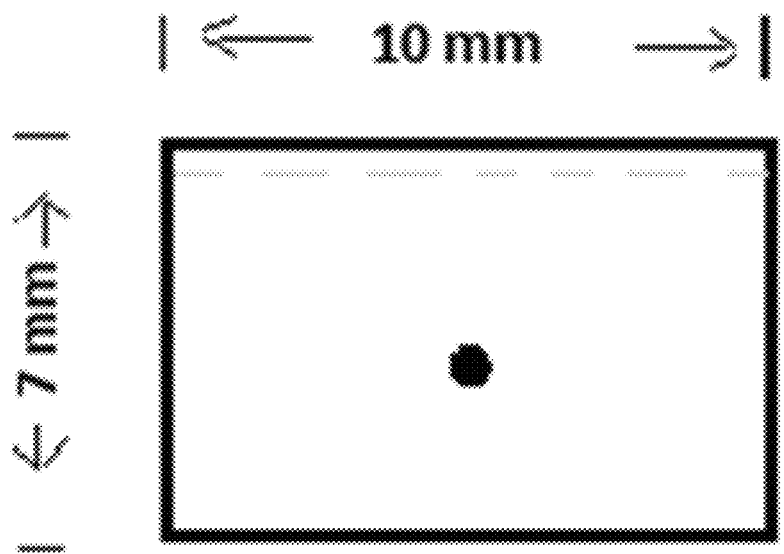
FIG. 3 is an end view of the molded test sample used to measure molding cooling time.

Molding cooling time was determined using the following process:

The polyamide composition to be tested was injection molded using a Sumitomo SE30D injection molding machine from Sumitomo heavy industries. The molded test sample has the dimensions shown by the top view in FIG. 1 with a first length of 55 mm, a bottom section having a length of 50 mm, and a return section having a maximum length of 140 mm. The molded test sample has a width and height (thickness) along the entire length of the test sample of 10 mm and 0.8 mm respectively except for a rectangular section at the beginning of the first section and not shown by the top view in FIG. 1. The top view in FIG. 1 (i) shows the location of the four ejector pins. The side view (ii) of the test sample in FIG. 2 shows the 7 mm height of the rectangular section at the beginning of the test sample (at the injection port) and the first length of 55 mm. The rectangular part or section of the test sample has dimensions of 10 mm width×7 mm height and a thickness of 0.8 mm as shown by the end view in FIG. 3. The end view in FIG. 3 also shows by the dotted line the location or attachment point of the first 55 mm length section of the test sample to the rectangular section. The end view in FIG. 3 additionally shows the location of a 0.3 mm diameter tunnel gate used for injection of the test sample. The tunnel gate is centered along the 10 mm width of the rectangular section (at 5 mm) and located 4 mm from the top of the rectangular section. The entire test sample, including the rectangular section, is molded in a single injection. FIGS. 1-3 may not be to scale. Depending on the flow characteristics of the polymer being tested, the length of the return section of the test sample will vary. Typically, for the polyamide compositions tested herein, the return section had a length ranging from X to Y.

Molding temperatures for the examples and comparative examples in the tables were conducted at 335° C. (temperature of the polyamide composition during injection) and a mold temperature of 125° C. Original molding temperatures of 330° C. with a mold temperature of 120° C. proved inadequate to provide definitive separation of mold cooling times for the test samples.

After the polyamide composition has been injected into the mold, the mold is allowed to cool before the mold is opened and the injection molded test bar is ejected by 4 round mold ejector pins having a diameter of 4.5 mm at the locations indicated in FIG. 1 by the 4 black diamonds. A round fifth ejector pin of 5 mm is used during ejection with the ejector pin centered on the bottom of the rectangular section. The time from completion of injection of the polyamide composition (injection stopped) into the mold to the time that the molded test bar is cooled sufficiently to be ejected from the mold, is the molding cooling time and is measured in seconds. The maximum cooling time for the polyamide compositions disclosed herein is 9 seconds.

The molding cooling time is the time necessary for the polyamide composition, after injection into the mold, to meet the following requirements:
  The molded test bar must be capable of being ejected from the mold by ejector pins
  The molded test bar does not stick to the mold
  The molded test bar does not break during ejection or exhibit cracks on the surface visible with the unaided human eye
  The molded test bar retains the dimensions of the mold after being ejected Multiple attempts to eject the test samples at different time intervals may be necessary to determine the mold cooling time. Comparative examples may not meet the molding cooling time requirements or may not meet the 9 second maximum cooling time.

Flammability

Flammability was determined according to UL-94 flammability test on ⅟₃₂" thick test bars.

Reflow Peak Temperature

Reflow peak temperature was measured using flexural bars having dimensions of ⅟₁₆" thick, ½" wide and 5" length. The flexural bars were prepared by injection molding at 330° C. melt temperature and 140° C. of mold temperature. After molding, the flexural bars were passed through an IR reflow oven, SNR-725GT, supplied by Senju Metal Industry, at a defined reflow peak temperature of either 260° C. or 270° C. according to IPC/JEDEC J-STD-020D.1.

After exposure in the IR oven, the flexural bars were visually examined by the unaided human eye. If the flexural test bars showed visual surface defects or blistering when exposed to 270° C. but not at 260° C., then the reflow peak temperature was recorded as 260° C. If the flexural test bars showed no visual surface defects or blistering when exposed to 270° C., then the reflow peak temperature was recorded as 270° C. or greater.

Inherent Viscosity (IV)

Inherent viscosity was measured on a 0.5% solution of the polyamide resin in m-cresol at 25° C. using a Schott AVS370 viscosity measuring unit and Schott CK300 cooling unit and a CT72 temperature controlled water-bath according to the method described in ISO 307:2007. Results are stated in dl/g.

Materials

In the compounds, processes, and articles exemplified in the tables below, the following materials were used. All percent values are by weight unless indicated otherwise.

Polyamides A to G were prepared by a continuous process such as disclosed in EP2459639B1 in paragraph [0063]. Polyamides H and I were prepared using a batch process in an autoclave as disclosed in WO201557557 A1 on pages 11 and 12 (example 1).

Polyamide A refers to PA 6T/610 made from terephthalic acid, sebacic acid, and hexamethylenediamine; wherein the two acids are used in a 62:38 molar ratio; having a melting point of 308° C. and an inherent viscosity (IV) of 0.89 dl/g.

Polyamide B refers to PA 6T/610 made from terephthalic acid, sebacic acid, and hexamethylenediamine; wherein the two acids are used in a 63:37 molar ratio; having a melting point of 310° C. and inherent viscosity (IV) of 0.81 dl/g.

Polyamide C refers to PA 6T/610 made from terephthalic acid, sebacic acid, and hexamethylenediamine; wherein the two acids are used in a 64:36 molar ratio; having a melting point of 313° C. and an inherent viscosity (IV) of 0.80 dl/g.

Polyamide D refers to PA 6T/610 made from terephthalic acid, sebacic acid, and hexamethylenediamine; wherein the two acids are used in a 65:35 molar ratio; having a melting point of 315° C. and an inherent viscosity (IV) of 0.81 dl/g.

Polyamide E refers to PA 6T/610 made from terephthalic acid, sebacic acid, and hexamethylenediamine; wherein the two acids are used in a 67:33 molar ratio; having a melting point of 321° C. and an inherent viscosity (IV) of 0.82 dl/g.

Polyamide F refers to PA 6T/66 made from terephthalic acid, adipic acid, and hexamethylenediamine; wherein the two acids are used in a 55:45 molar ratio; having a melting point of 310° C. and an inherent viscosity (IV) of 0.97 dl/g.

Polyamide G refers to PA 6T/610 made from terephthalic acid, sebacic acid, and hexamethylenediamine; wherein the two acids are used in a 58:42 molar ratio; having a melting point of 304° C. and an inherent viscosity (IV) of 0.88 dl/g.

Polyamide H refers to PA 6T/612 made from terephthalic acid, dodecanedioic acid, and hexamethylenediamine; wherein the two acids are used in a 55:45 molar ratio; having a melting point of 299° C. and an inherent viscosity (IV) of 1.04 dl/g.

Polyamide I refers to PA 6T/612 made from terephthalic acid, dodecanedioic acid, and hexamethylenediamine; wherein the two acids are used in a 62:38 molar ratio; having a melting point of 310° C. and an inherent viscosity (IV) of 0.77 dl/g.

Glass Fibers: Chopped strands having an average length of X mm and an average diameter of Y microns available as ECS 301HP from CPIC, Chongqing, China.

Flame Retardant (FR):—Exolit® OP1230: aluminum salt of diethylphosphinic acid available from Clariant, DE, USA.

Lubricant A: calcium montanate available as Licomont® CaV from Clariant Corporation, Muttenz, Switzerland.

Lubricant B: N-stearyl erucamide available as Kemamide® E180 from PMX Biogenix, Memphis, TN, USA.

Lubricant C: Aluminum stearate available as AL-103 from Nitto Kasei Kogyo K.K., Yokohama, Japan.

Lubricant D: ethylene bis-stearamide available as Kao wax EB-ff from Kao Corporation, Tokyo, Japan.

Lubricant E: Calcium behenate available as CS-7 from Nitto Kasei Kogyo K.K., Yokohama, Japan.

FR Synergist A: boehmite available as BMT-33 from Kawai Lime Industry Co., Japan.

FR Synergist B: Zinc Borate available as Firebrake ZB from Chemtura, Philadelphia, PA, USA.

FR Synergist C: Zinc Stannate available as Flamtard S available from Nippon Light Metal Company, Ltd., Japan.

Nucleant A: talc available as FH-105 from Fuji Talc, Japan

Nucleant B: Boron nitride available from Denka, Japan

Carbon Black was obtained from Dainichi Seika Color and Chemical as a masterbatch and used as a colorant.

TABLE 1

| Ingredients | | C1 | C2 | E1 | E2 | E3 | E4 | E5 |
|---|---|---|---|---|---|---|---|---|
| Polymer A | wt % | 55.55 | | 55.05 | 55.35 | | | |
| Polymer B | wt % | | | | | 55.55 | | |
| Polymer D | wt % | | | | | | 55.55 | |
| Polymer E | wt % | | | | | | | 55.55 |
| Polymer F | wt % | | 55.55 | | | | | |
| FR | wt % | 12 | 12 | 12 | 12 | 12 | 12 | 12 |
| FR synergist A | wt % | 2 | 2 | 2 | 2 | 2 | 2 | 2 |
| FR synergist B | wt % | 0.3 | 0.3 | 0.3 | 0.3 | 0.3 | 0.3 | 0.3 |
| Lubricant A | wt % | 0.15 | 0.15 | 0.15 | 0.15 | 0.15 | 0.15 | 0:15 |
| Nucleant A | wt % | | | | 0.5 | | | |
| Nucleant B | wt % | | | | | 0.2 | | |
| Glass Fiber | wt % | 29.85 | 29.85 | 29.85 | 29.85 | 29.85 | 29.85 | 29.85 |
| Physical Properties | | | | | | | | |
| Molding Cooling Time (s) | | >16 | 6 | 8 | 8 | 8 | 8 | 8 |
| Max. reflow peak temperature (° C.) | | ≥270 | 260 | ≥270 | ≥270 | ≥270 | ≥270 | ≥270 |
| Flame Retardancy | | V-0 | V-0 | V-0 | V-0 | V-0 | V-0 | V-0 |

The results in table 1 show the effect molar ratios of 6T:610 have on molding cooling times. C1 comprises a polyamide having a 62:38 molar ratio of repeat units, a flame retardant and synergist, glass fibers, and a lubricant. C1 fails to obtain a molding cooling time of 9 seconds or less and a maximum reflow peak temperature of at least 270° C. E1 and E2 both comprise a nucleant which is absent from the composition of C1. The addition of a nucleant to the polyamide composition of C1 lowers the molding cooling time to 9 seconds or less as shown by E1 and E2 even when a semi-aromatic polyamide is used which has a 6T:610 molar ratio of less than 63:37.

E3, E4, and E5 all comprise semi-aromatic polyamides having a 6T:610 molar ratio of from 63:37 to 67:33 and all three examples exhibit a molding cooling time of 9 seconds or less without the need for a nucleant.

TABLE 2

| Ingredients | E6 | E7 | E8 | E9 | E10 | E11 |
|---|---|---|---|---|---|---|
| Polymer C | 50.34 | 50.37 | 50.34 | 50.34 | 50.34 | 50.37 |
| FR | 15.00 | 15.00 | 15.00 | 15.00 | 15.00 | 15.00 |
| FR synergist A | 2.5 | 2.5 | 2.5 | 2.5 | 2.5 | 2.5 |
| FR synergist B | 0.38 | 0.38 | 0.38 | 0.38 | 0.38 | |
| FR synergist C | | | | | | 0.38 |
| Nucleant A | 1.55 | 1.55 | 1.55 | 1.55 | 1.55 | 1.55 |
| Carbon black | 0.08 | 0.08 | 0.08 | 0.08 | 0.08 | 0.08 |
| Glass Fibers | 30.00 | 30.00 | 30.00 | 30.00 | 30.00 | 30.00 |
| Lubricant A | 0.15 | | | | | |
| Lubricant B | | 0.12 | | | | 0.12 |
| Lubricant C | | | 0.15 | | | |
| Lubricant D | | | | 0.15 | | |
| Lubricant E | | | | | 0.15 | |
| Physical Properties | | | | | | |
| Molding Cooling Time (s) | 6 | 5 | 8 | 6 | 7 | 6 |
| Max. reflow peak temperature (° C.) | ≥270 | ≥270 | ≥270 | ≥270 | ≥270 | ≥270 |
| Flame Retardancy | V-0 | V-0 | V-0 | V-0 | V-0 | V-0 |

Table 2 shows semi-aromatic polyamide compositions in which the 6T:610 molar ratio is 64:36 (E6 to E11) and which comprise a nucleant and a lubricant. E6 and E7 exhibit a desirable combination of molding cooling time, flame retardancy, and reflow peak temperature.

TABLE 3

| Ingredients | | C3 | C4 | E12 |
|---|---|---|---|---|
| Polymer G | wt % | 55.05 | | |
| Polymer H | wt % | | 55.05 | |
| Polymer I | wt % | | | 55.05 |
| Polymer A | wt % | | | |
| FR | wt % | 12 | 12 | 12 |
| FR synergist A | wt % | 2 | 2 | 2 |
| FR synergist B | wt % | 0.3 | 0.3 | 0.3 |
| Lubricant A | wt % | 0.15 | 0.15 | 0.15 |
| Nucleant A | wt % | 0.5 | 0.5 | 0.5 |
| Glass Fiber | wt % | 30 | 30 | 30 |
| Physical Properties | | | | |
| Molding Cooling Time (s) | | 12 | >16 | 8 |
| Max. reflow peak temperature (° C.) | | ≥270 | ≥270 | ≥270 |
| Flame Retardancy | | V-0 | V0 | V-0 |

Table 3 shows the effect the molar concentration of 6T has on PA6T/610 and PA6T/612 polyamides. C3 comprises 58 mole percent 6T in PA 6T/610 and C4 comprises 55 mole percent 6T in PA 6T/612. E12 has the same composition as C3 and C4 with the only difference being the polyamide used. E12 uses PA 6T/612 comprising 62 mole percent 6T. Both C3 and C4 fail to exhibit the desired combination of a mold cooling time of 9 seconds or less, a maximum reflow peak temperature of at least 270° C. and flame retardancy of V-0.

TABLE 4

| Ingredients | | E13 | E14 | C5 | E15 | E16 | E17 | C6 | C7 |
|---|---|---|---|---|---|---|---|---|---|
| Polymer A | wt % | 55.45 | | 55.45 | 55.16 | 54.95 | 54.7 | 53.95 | 53.4 |
| Polymer C | wt % | | 55.45 | | | | | | |
| Polymer I | wt % | | | | | | | | |

TABLE 4-continued

| Ingredients | | E13 | E14 | C5 | E15 | E16 | E17 | C6 | C7 |
|---|---|---|---|---|---|---|---|---|---|
| Polymer A | wt % | | | | | | | | |
| FR | wt % | 12 | 12 | 12 | 12 | 12 | 12 | 12 | 12 |
| FR synergist A | wt % | 2.3 | 2.3 | 2.0 | 2.0 | 2.0 | 2.0 | 2.0 | 2.0 |
| FR synergist B | wt % | 0 | 0 | 0.3 | 0.3 | 0.3 | 0.3 | 0.3 | 0.3 |
| Lubricant A | wt % | 0.15 | 0.15 | 0 | 0.04 | 0.25 | 0.5 | 0.7 | 1.25 |
| Nucleant A | wt % | 0.5 | 0.5 | 0.5 | 0.5 | 0.5 | 0.5 | 0.5 | 0.5 |
| Glass Fiber | wt % | 30 | 30 | 30 | 30 | 30 | 30 | 30 | 30 |
| Physical Properties | | | | | | | | | |
| Molding Cooling Time (s) | | 8 | 8 | >16 | 8 | 7 | 5 | 5 | 5 |
| Max. reflow peak temperature (° C.) | | ≥270 | ≥270 | ≥270 | ≥270 | ≥270 | ≥270 | ≥270 | ≥270 |
| Flame Retardancy | | V-0 | V0 | V-0 | V-0 | V-0 | V-0 | V-2 | V-2 |

Table 4 shows the results for polyamide compositions which comprise 62 mole percent 6T (except for E14 which comprises 64 mole percent 6T). E13 and E14 comprise a flame retardant, a single flame retardant synergist, a lubricant, glass fibers, and a nucleant and exhibit the desired combination of a mold cooling time of 9 seconds or less, a maximum reflow peak temperature of at least 270° C., and flame retardancy of V-0. C5 does not comprise a lubricant and fails to exhibit the desired mold cooling time of 9 seconds or less, E15 to E17 and C6 to C7 in table 4 all have identical compositions except for the concentration of lubricant. At lubricant concentrations of about 0.65 weight percent or less, E22 to E24 exhibit the desired combination of properties. However, when the lubricant concentration is above about 0.65 weight percent as shown by C6 and C7, the resulting polyamide composition fails to exhibit a flame retardancy of V-0.

The invention claimed is:
1. A polyamide composition comprising:
(a) 30 to 60 weight percent of at least one semi-aromatic polyamide comprising:
(i) 63 to 67 mole percent hexamethylene terephthalamide repeat units; and
(ii) 33 to 37 mole percent hexamethylene decanamide repeat units;
(b) 10 to 15 weight percent of at least one flame retardant comprising one or more of a phosphinate of the formula (I); a diphosphinate of the formula (II); and polymers of (I) and/or (II)

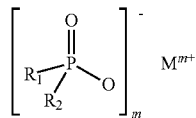

(I)

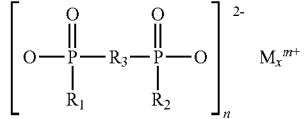

(II)

wherein R1 and R2 are independently selected from hydrogen, a linear, branched, or cyclic $C_1$-$C_6$ alkyl group, or a $C_6$-$C_{10}$ aryl; $R_3$ being a linear or branched $C_1$-$C_{10}$ alkylene group, a $C_6$-$C_{10}$ arylene group, a $C_6$-$C_{12}$ alkyl-arylene group, or a $C_6$-$C_{12}$ aryl-alkylene group; M being selected from the group consisting of calcium ions, aluminum ions, magnesium ions, zinc ions, antimony ions, tin ions, germanium ions, titanium ions, iron ions, zirconium ions, cerium ions, bismuth ions, strontium ions, manganese ions, lithium ions, sodium ions, potassium ions and combinations thereof; and m, n, and x each being a same or different integer of 1-4;
(c) 0.02 to 0.65 weight percent of a lubricant selected from the group consisting of fatty acid amides and fatty acid metal salts, said fatty acid metal salts selected from the group consisting of aluminum stearate, sodium stearate, zinc stearate, calcium stearate, aluminum 12-hydroxy stearate, sodium 12-hydroxy stearate, zinc 12-hydroxy stearate, calcium 12-hydroxy stearate, aluminum behenate, sodium behenate, zinc behenate, calcium behenate, aluminum montanate, sodium montanate, zinc montanate, and calcium montanate;
(d) 5 to 50 weight percent of at least one inorganic reinforcing agent;
(e) 0 weight percent talc and boron nitride; and
(f) 1 to 2.5 weight percent boehmite; and wherein:
the weight percentages of (a) to (f) are based on the total weight of the polyamide composition;
the weight percentages of (a) to (f) equal 100 weight percent;
said polyamide composition exhibits a molding cooling time of less than or equal to 9 seconds;
said polyamide composition exhibits a reflow peak temperature of at least 270° C. as measured according to IPC/JEDEC J-STD-020D.1; and
said polyamide composition exhibits a flammability of V-0 measured according to UL-94 flammability test.

2. The polyamide composition of claim 1 wherein flame retardant (b) is selected from the group consisting of aluminum diethylphosphinate, aluminum methylethylphosphinate, zinc diethylphosphinate, aluminum isopropylisobutylphosphinate, aluminum isopropyltertbutylphosphinate, aluminum diisobutylphosphinate, and combinations of these.

3. The polyamide composition of claim 1 wherein lubricant (c) is selected from the group consisting of fatty acid amide lubricants or fatty acid metal salt lubricants.

4. The polyamide composition of claim 3 wherein the fatty acid amide lubricant (c) is selected from the group consisting of N-stearyl erucamide, methylenebehenylamide, ethylenebisbehenylamide, dioctadecyladipamide, dioctadecylsuccinamide, erucamide, stearylamide, erucyl stearamide, and combinations of these.

5. The polyamide composition of claim 3 wherein the fatty acid metal salt lubricant (c) is selected from the group consisting of aluminum behenate, sodium behenate, sodium montanate, aluminum montanite, calcium behenate, and calcium montanate, and combinations of these.

6. The polyamide composition of claim 1 wherein inorganic reinforcing agent (d) is selected from the group consisting of glass fibers, glass flakes, kaolin clay, wollastonite, calcium carbonate, silica, carbon fibers, potassium titanate, and combinations of these.

7. An article comprising the polyamide composition of claim 1.

8. The article of claim 7 in the form of electrical and electronic connectors, SMT connectors, non-electrical connectors, motor housings, insulators, motor insulators, insulator housings, bobbins, contactor housings, switches, SMT switches, battery housings, terminal blocks, and breaker housings.

9. The polyamide composition of claim 1, wherein the at least one semi-aromatic polyamide is present in an amount from 50.34 to 55.55 weight percent.

10. The polyamide composition of claim 1, wherein the at least one flame retardant is present in an amount from 12 to 15 weight percent.

11. The polyamide composition of claim 1, wherein boehmite is present in an amount from 2 to 2.5 weight percent.

12. The polyamide composition of claim 1, wherein the at least one semi-aromatic polyamide is present in an amount from 50.34 to 55.55 weight percent, the at least one flame retardant is present in an amount from 12 to 15 weight percent, and boehmite is present in an amount from 2 to 2.5 weight percent.

* * * * *